(12) United States Patent
Capitani

(10) Patent No.: US 10,219,648 B2
(45) Date of Patent: Mar. 5, 2019

(54) SYSTEM FOR PREPARING AN INFUSED BEVERAGE

(71) Applicant: SCACCO SA, Lugano (CH)

(72) Inventor: Emilio Alfredo Capitani, Lugano (CH)

(73) Assignee: SCACCO SA, Lugano (CH)

( * ) Notice: Subject to any disclaimer, the term of this patent is extended or adjusted under 35 U.S.C. 154(b) by 261 days.

(21) Appl. No.: 15/189,703

(22) Filed: Jun. 22, 2016

(65) Prior Publication Data
US 2017/0367519 A1    Dec. 28, 2017

(51) Int. Cl.
*A47J 31/00*    (2006.01)
*A47J 31/06*    (2006.01)
*A47J 31/36*    (2006.01)

(52) U.S. Cl.
CPC ....... *A47J 31/0673* (2013.01); *A47J 31/0668* (2013.01); *A47J 31/3623* (2013.01); *A47J 31/3676* (2013.01)

(58) Field of Classification Search
CPC ................ A47J 31/3623; A47J 31/3628; A47J 31/3676; A47J 31/368; A47J 31/369; A47J 31/3695
USPC .................................................. 99/295, 323
See application file for complete search history.

(56) References Cited

U.S. PATENT DOCUMENTS

| | | | | |
|---|---|---|---|---|
| 4,644,856 A | * | 2/1987 | Borgmann | A47J 31/4464 210/455 |
| 9,815,617 B2 | * | 11/2017 | Oh | B65D 85/8043 |
| 2002/0148356 A1 | | 10/2002 | Lazaris et al. | |
| 2004/0118290 A1 | * | 6/2004 | Cai | A47J 31/4478 99/275 |
| 2005/0150390 A1 | * | 7/2005 | Schifferle | B65D 85/8043 99/295 |
| 2010/0303965 A1 | * | 12/2010 | Mariller | A47J 31/3628 426/84 |
| 2014/0083302 A1 | | 3/2014 | Aardenburg et al. | |

OTHER PUBLICATIONS

Italian Search Report dated Jan. 11, 2016, in corresponding Italian priority application.

* cited by examiner

*Primary Examiner* — Reginald L Alexander
(74) *Attorney, Agent, or Firm* — Young & Thompson

(57) ABSTRACT

System for making an infused beverage, includes: at least one infusion assembly of a machine for preparing infused beverages; at least one capsule containing an aromatic substance for the preparation of an infused beverage through interaction with a liquid; the capsule including: a cup-shaped body with a recess having a depth for containing a predetermined amount of an aromatic substance; the body including at least one side wall and a bottom, and running around a vertical axis; the first infusion assembly including: a first infusing member, including a recess for accommodating at least partially the capsule; a second infusing member for cooperating with the first infusing member so as to at least partially close the recess to define an accommodating seat with the first infusing member; the capsule including first coupling elements; the infusion assembly including second coupling elements structured to removably engage the first coupling elements.

18 Claims, 3 Drawing Sheets

SYSTEM FOR PREPARING AN INFUSED BEVERAGE

FIELD OF THE INVENTION

The present invention refers to a system for preparing an infused beverage such as coffee, tea, tisanes, etc., and in particular a system for preparing an infused beverage from a capsule.

The present invention further concerns an infusion assembly of machines for making an infused beverage such as coffee, tea, tisanes, chocolate, etc., adapted for the interaction with the capsule.

BACKGROUND OF THE INVENTION

Known capsules containing an aromatic substance for the production of an infusion beverage of coffee, tea, tisanes, etc., are usually made of plastic material.

The Applicant however noticed that, due to high pressures playing in the infusion chamber, the capsules can tend to get deformed thus not allowing a correct extraction of the infused beverage.

The Applicant further observed that the capsules made of plastic material have issues referring to the disposal of the same used capsules, to their manufacturing and that they often need an outer packaging.

Moreover, the Applicant noticed that the capsules made of plastics can involve the wearing of the infusing machine parts contacting the capsule, in particular of the piercing tips.

In order to solve at least partially the afore mentioned problems, the manufacturing of capsules made of paper material, or thermoformed material, has been proposed.

However, the Applicant noticed that the replacement of a capsule made of plastic material with another one having similar shape and size, but made of paper material or thermoformed material, did not give expected results, most of all due to the fragility of paper not withstanding the pressure of the infusion liquid injected into the infusion chamber.

SUMMARY OF THE INVENTION

Therefore, the invention in its first aspect relates to a system for making an infused beverage, comprising:

at least one infusion assembly of a machine for preparing infused beverages;

at least one capsule containing an aromatic substance for the preparation of an infused beverage through interaction with a liquid; said capsule comprising:

a cup-shaped body comprising a recess having a depth adapted to contain a predetermined amount of an aromatic substance; said body comprising at least one side wall and a bottom and running around a vertical axis (X-X);

said at least one first infusion assembly comprising:

a first infusing member, comprising a recess adapted for accommodating at least partially said capsule, a second infusing member, adapted for cooperating with said first infusing member so as to at least partially close said recess to define an accommodating seat with said first infusing member;

characterized in that:

said at least one capsule comprises first coupling means;

said at least one infusion assembly comprises second coupling means adapted to removably engage said first coupling means;

said first coupling means comprise at least one radially protruding member or radial recess;

said second coupling means comprising at least one radial recess or radially protruding member shaped to couple respectively with the corresponding radial recess or radially protruding member of the first coupling means;

the capsule comprises a disc-shaped member comprising a plurality of holes for the water passage and adapted to be at least partially inserted in the recess.

The Applicant found that the insertion into the capsule of a disc-shaped filtering member has the function of pressing the amount of the ingredient, for example coffee, inside the capsule and of uniformly distributing the water entering the capsule, for a better coffee delivering. On the other hand, the presence of the first coupling means causes obtaining a stop element at the capsule bottom for the same disc-shaped member thus preventing it from being torn, broken or damaged during the infusion.

In the scope of the present invention, with vertical direction is meant a direction substantially coincident and/or parallel with that one of an axis X-X coincident with the axis of the prevalent dimension of the capsule. With "radial direction", "radially" is meant a direction substantially orthogonal to that one of the axis X-X, generically leaving the axis X-X.

With radial extent is meant the maximum height of a rib in the radial direction, in other terms how much the rib distances itself in the radial direction from the plane it departs from.

In the above said aspect, the present invention can have at least one of the preferred characteristics hereinafter described.

Preferably, the first coupling means comprise at least one radial groove arranged on the radially outer surface of said side wall.

Advantageously, the groove extends for at least 50% of the depth (P) of said recess.

Conveniently, the groove extends from the bottom along a straight line.

Preferably, the first coupling means comprise at least three radial grooves angularly spaced on the radially outer surface of said side wall.

Advantageously, the second coupling means comprise at least one rib extending axially on the inner surface of the recess.

Preferably, the rib extends for at least 50% of the depth H of said recess.

Conveniently, the rib extends from the bottom of said recess.

Advantageously, the second coupling means comprise at least three ribs angularly spaced on the inner surface of said first infusing member and adapted to couple with three corresponding grooves provided on said capsule.

Preferably, each rib has an extent of at least 2 mm in the radial direction.

Conveniently, the disc-shaped member is adapted to abut against at least one shoulder formed by said at least one groove.

Advantageously, the first infusing member is removable with respect to the machine.

Preferably, the first infusing member has a member removable with respect to said recess; said removable member comprising at least one annular portion comprising said second coupling means adapted to removably engage said first coupling means.

Further characteristics and advantages of the invention will be more evident from the detailed description of some preferred embodiments, but not exclusive, of a system for making an infused beverage according to the present invention.

BRIEF DESCRIPTION OF THE DRAWINGS

Such a description will be hereinafter explained referring to the attached drawings, provided for purposes of illustrations only, and thereby not limitative, wherein.

DETAILED DESCRIPTION OF THE INVENTION

Figure 1:
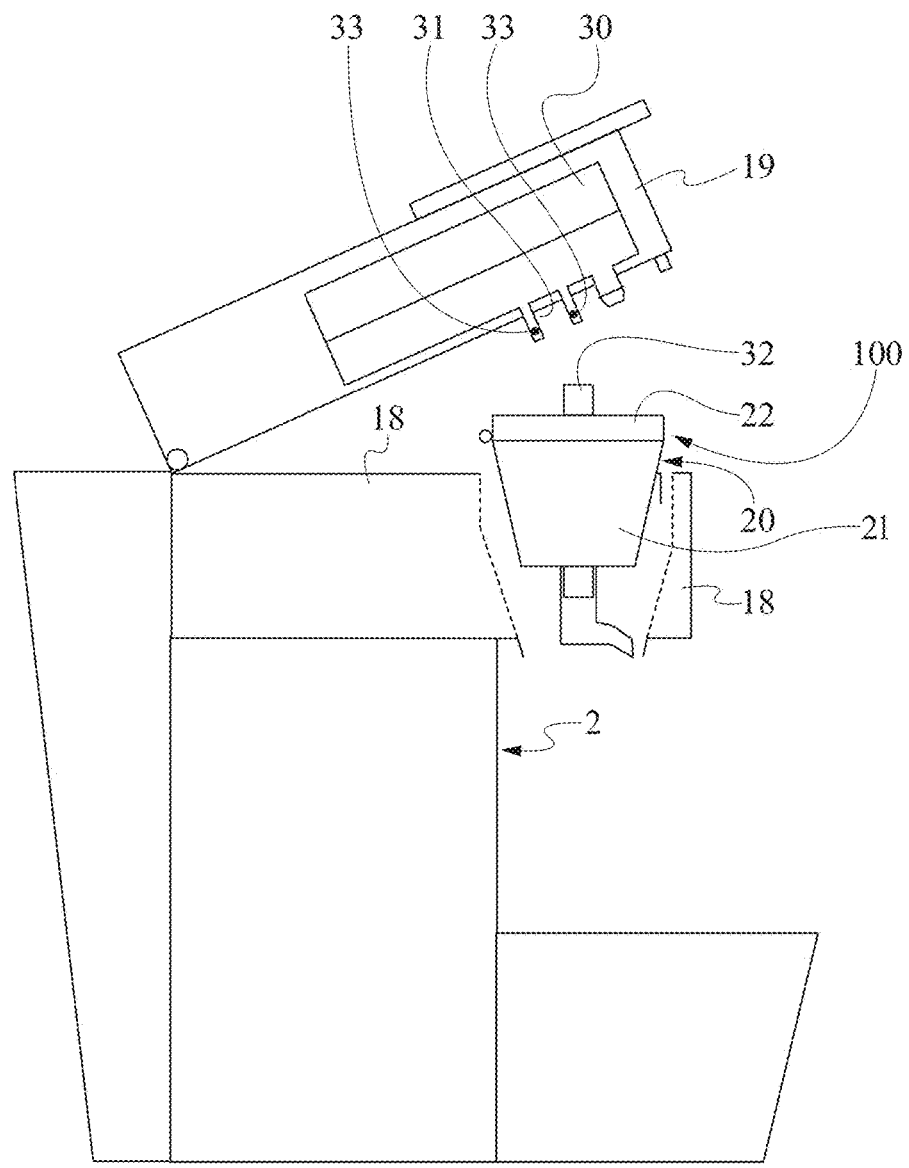
FIG. 1 is a schematic perspective view of a first embodiment of a machine for making an infused beverage such as coffee, tisanes, chocolate, etc., provided with the system according to the present invention.

Referring to FIGS. 1-4, a system for making infused beverages according to the present invention, is denoted with the reference numeral 100. Analogously, a capsule with an aromatic substance to be used in an infusing machine according to the present invention, is denoted with the numeral reference 10.

The capsule 10 containing the aromatic substance, such as for example powdered coffee, interacts with a liquid for producing a beverage, such as for example an espresso.

The interaction between the capsule 10 and the liquid can be represented, for example, by the hot water feed at a relatively low pressure of about two atmospheres into a closed capsule defined by a cup-shaped body 3 housing a predetermined amount of powdered coffee and hermetically closed at its open end by a sealing wall integrally connected with the cup-shaped body 3.

After the hot water has entered, a beverage is extracted from the closed capsule 10, for example an espresso, through the extracting needles. The extracting needles are hollow and have a longitudinal adduction slits and are inserted in the closed capsule 10 by perforating a sealing wall.

The hollow extracting needles are inserted in the sealing wall before the hot water is fed to the closed capsule 10.

Figure 2:
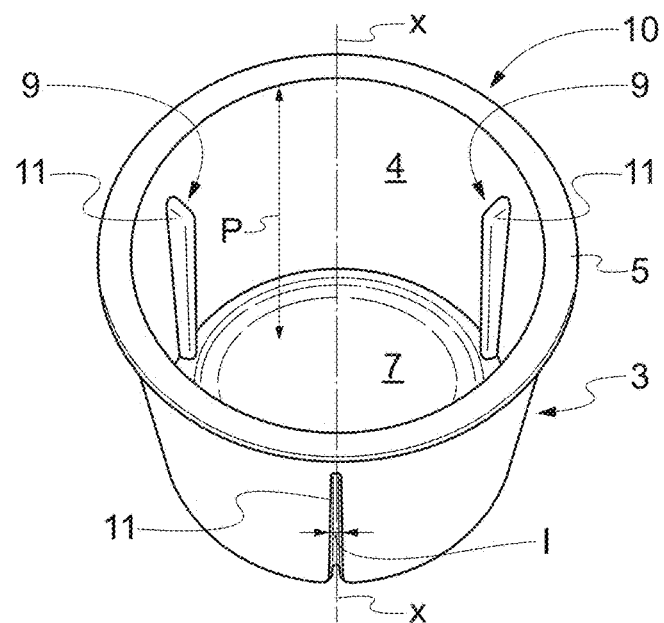
FIG. 2 is a schematic perspective view of a first embodiment of a capsule of the system for making an infused beverage according to the present invention.

Therefore the capsule 10, as shown in FIG. 2, has a cup-shaped body 3, usually a truncated-cone shaped one, adapted to contain the ingredients. The body extends around a vertical axis X-X.

The body 3 has an opening at its upper end and a lid not shown in FIG. 2.

The lid can be welded or clipped to a circumferential flanged ring 5 circumferentially extending from the upper end of the body 3.

The body 3 can also be without the circumferential flanged ring 5, without departing from the protection scope of the present invention.

Usually, the body 3 comprises a side surface 6 substantially arranged in accordance with a cylinder or truncated cone, and a bottom 7.

The side surface 6 and the bottom 7 define a recess 4 shaped and sized to contain the ingredients, such as for example a given measure of powdered coffee. The recess 4 has depth P.

The body 3 of the capsule is preferably made of plastic material.

Alternatively, the body 3 of the capsule is made of paper or cellulose based material.

The material of which the body 3 is made can be a biodegradable and/or compostable material.

Preferably, the body 3 with the circumferential flanged ring 5 is obtained by printing in one piece, with no welds or glues.

For stiffening the structure of the capsule 10 and avoiding the same from bending or flexing under the pressure of the fluid entering the same and/or the mechanical parts of the infusion chamber, the capsule 10 has first coupling means 9 shaped to couple with corresponding second coupling means 9' provided on at least a portion of an infusion assembly 20 of a machine for preparing infused beverages.

The first coupling means 9 comprise at least one radially protruding member or radial recess shaped to couple respectively with the corresponding radial recess or radially protruding member provided on at least a portion of an infusion assembly 20 of a machine for preparing infused beverages.

In the embodiment shown in figures, the first coupling means 9 are depicted on at least one radial recess obtained on the outer side surface of the body 3.

Preferably, the first coupling means 9 are made with at least one groove 11 extending on the outer side surface of the body 3 and shaped to be coupled with a corresponding rib 12 being on the inner side surface of an apposite infusion assembly 20 of a machine for preparing infused beverages, such as coffee.

In this case the rib 12 denotes the second coupling means 9'.

Preferably, according to this embodiment, there are three grooves 11 extending on the side surface of the body 3.

Each groove 11 extends for at least 50% of the depth P of the recess 4 of the capsule 10 from the bottom 7 of the capsule.

Preferably, in order to lend an appropriate structural stiffness, each groove 11 extends for at least 70% of the depth P of the recess 5 of the capsule 10 from the bottom 7 of the capsule itself.

Still according to this embodiment, the groove 11 extends from the bottom 7 of the capsule 10 along a substantially vertical straight line, in the direction of the circumferential flanged ring 5. Preferably, the groove 11 extends from the bottom 7 of the capsule along a straight line substantially parallel to the axis X-X.

Alternatively, the groove 11 can extend from the bottom 7 of the capsule along an inclined straight line, or alternately along a curved line or a given path, without departing from the protection scope of the present invention.

Figure 4:
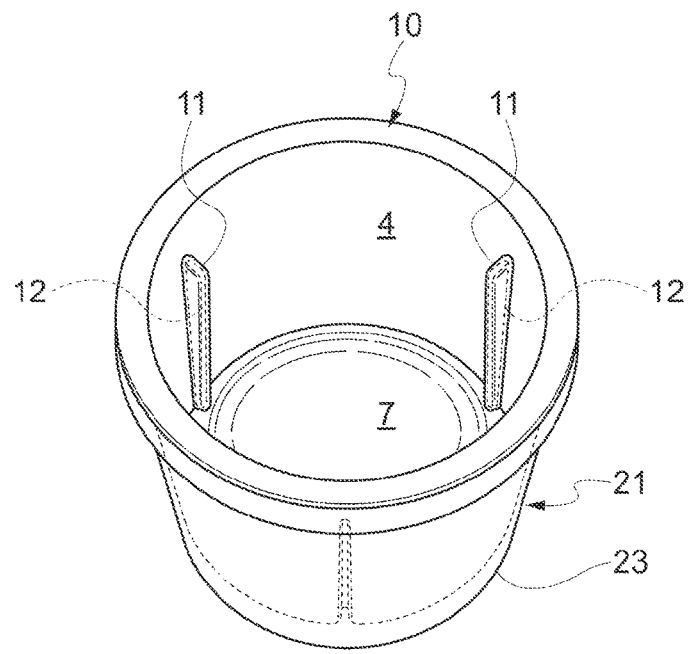
FIG. 4 is a schematic perspective view of the capsule of FIG. 2 inserted and coupled with the first infusing member of the infusion assembly of FIG. 3.

Still according to the embodiment shown in FIGS. 2, 4, the three grooves 11 are angularly spaced on the side surface 6 of the capsule 10.

Preferably, the three grooves 11 are angularly spaced by the same angle, in other terms the angular distance between two circumferentially adjacent grooves is the same and equal to about 120°.

According to another embodiment not shown in figures, there can be more than three grooves 11 without departing from the protection scope of the present invention.

Each groove 11 has width 1 between 1.5 and 5 mm, preferably each groove 11 has width from 2 and 3 mm, limits included.

Still referring to the embodiment shown in figures, each groove 11 has maximum depth greater than 1 mm.

Preferably, each groove 11 has not constant depth, on the contrary increasing along a direction leaving the bottom 7 of the capsule 10.

Each groove 11 makes a shoulder 16 inside the recess 4 and, particularly, at its upper end. According to an embodiment, the shoulder 16 is shaped to abut against a disc-shaped filtering member 17.

In fact, the capsule according to the present invention has a disc-shaped filtering member 17.

Figure 2A:
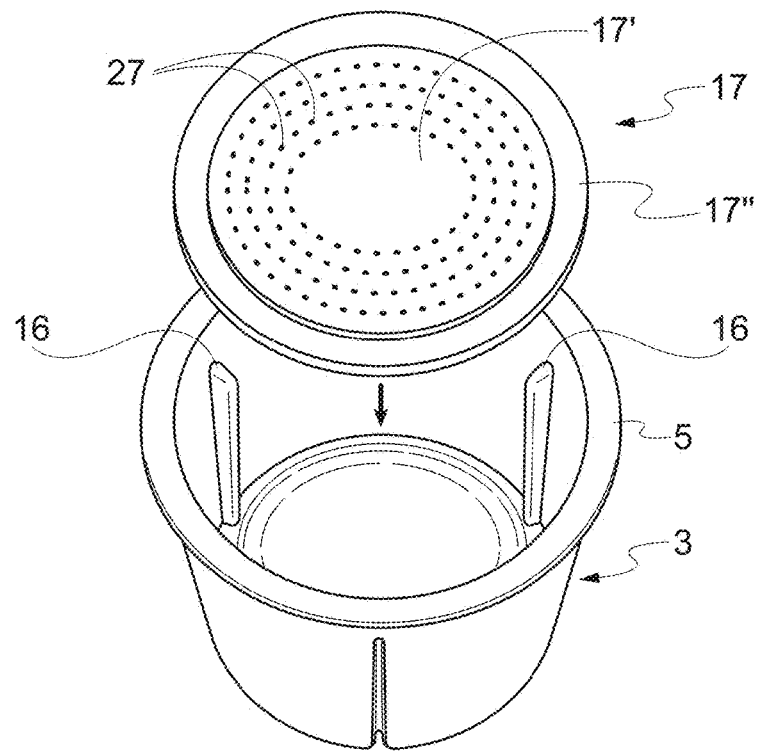
FIG. 2a is a schematic perspective view of a second embodiment of a capsule of the system for making an infused beverage according to the present invention.

A capsule 10 is shown, by way of example, in FIG. 2a of the system according to the present invention provided with the disc-shaped filtering member 17.

The disc-shaped filtering member 17 has the function of pressing the amount of the ingredient, for example coffee, inside the capsule 10 and of uniformly distributing the water entering the capsule 10.

The disc-shaped filtering member 17 is composed of a central portion 17' provided with a plurality of holes 27 for the water passage and with an annular edge 17" arranged outside of the central portion 17'. According to an embodiment, the annular edge 17" is adapted to abut against the shoulders of the ribs 11.

When the capsule is not inserted in the infusion assembly, in case wherein the disc-shaped member 17 does not abut against the shoulders of the ribs 11, the latter are anyway shaped to act as limit elements for the disc-shaped member 17 in order to stop its travel to the bottom 7 of the capsule 10, when it is subject to the water pressure.

If the disc-shaped member 17 is free to slid to the bottom 7 of the capsule 10 under the pressure force of the water entering the capsule 10 itself, it could cause a damaging or breaking thereof with an inevitable leak of aromatic substance/powdered coffee.

As previously mentioned, each groove 11 is adapted to couple with a corresponding rib 12 provided on the inner side surface of an infusion assembly 20, as better described in the following. In particular, each groove 11 is adapted to couple with a corresponding rib 12 provided on the inner side surface 8 of a first infusing member 21 of an infusion assembly 20, as better described in the following.

The infusion assembly 20, as shown in FIG. 1, comprises a first infusing member 21 provided with a recess and a second infusing member 22 coopering with the first infusing member 21 to define, by coupling therewith, an infusion chamber.

In the embodiment shown in FIG. 1, the first infusing member 21 can be housed in a lower portion of the frame of the machine 2, whereas the second infusing member 22 can be housed in an upper portion 19 of the frame 2 of the machine.

Furthermore, still referring to the embodiment shown in FIG. 1, the lower portion 18 of the frame of the machine 50 is fixed, whereas the upper portion 19 of the frame of the machine 50 is movable.

The upper movable portion 19 is movable between a working position in which it cooperates with the lower fixed portion 18 to define, by coupling therewith, an accommodating seat to accommodate the infusion assembly 20 and a second position in which the upper movable portion 19 is drawn away from the lower fixed portion 18, the accommodating seat for the infusion assembly 20 still having the access open.

In the embodiment shown in FIG. 1, the upper movable portion 19 is hinged to the lower fixed portion 18.

In the embodiment depicted in FIG. 1, the upper movable portion 19 has further an exchanger 30; in this way, differently from conventional machines, the infusion chamber is supplied by hot water almost directly, i.e. without long ducts involving heat loss.

According to this alternative embodiment, the exchanger 30 has a water outlet duct 31 adapted to cooperate with an inlet shank 32 placed on the second infusing member 22, hereinafter described more in detail.

Between the afore said water outlet duct 31 and the inlet shank 32 sealing members can be provided, such as annular sealing members 33.

In an alternative embodiment, the lower portion 18 of the frame 2 of the machine is movable, whereas the upper portion 19 of the frame of the machine is fixed.

Still in another alternative embodiment, the infusion assembly 20 can horizontally extends, in other term the first infusing member 21 and the second infusing member 22 are supported by a supporting frame. For example, said frame has a parallelepiped box-shaped structure substantially extending along a main axis X-X that, in a preferred embodiment, can be taken as horizontal.

The supporting frame comprises two side plates opposite to each other and parallel to the main axis X-X. The first infusing member 21 and the second infusing member 22 are placed between and supported by said side plates.

At least one between said first infusing member 3 and said second infusing member 22 is a movable infuser. Said movable infuser is translatable with respect to the other one along a translation axis coincident or parallel with the main axis X-X of the frame 2. The movable infuser is movable between a rearward open position and a forward closed position to form the accommodating chamber. In the closed position, the second infusing member 22 is moved closer and adjacent to the first infusing member 21 so that the infusion chamber can be hermetically closed.

According to another embodiment, the first infusing member 21 is removable with respect to the machine, whereas the second infusing member can be made integral with the machine.

In all embodiments, the first infusing member 21 has a cup shape comprising a side wall 23 and a bottom 24.

The inner side wall 23 and the bottom 24 define, at least partially, the accommodating recess of the capsule 10.

For this purpose, the recess of the first infusing member reproduces the outer shape of the capsule.

To structurally support the capsule 10 during the infusion, on the inner side wall 8 of the first infusing member 21 second coupling means 9' areprovided and adapted to removably engage with the first coupling means of the capsule 10.

Referring to the embodiments shown in the figure, on the inner side surface 8 three ribs 12 are provided as second coupling means 9' and adapted to couple with the three ribs 11 provided on the outer side wall of the body 3 of the capsule 10.

Preferably, according to this embodiment, there are three ribs 12 extending on the inner side surface 23 of the first infusing member 21.

Each rib 12 extends for at least 50% of the depth P2 of the recess accommodating the first infusing member 21.

Preferably, in order to lend an appropriate structural stiffness, each rib 12 extends for at least 70% of the depth P2 of the recess accommodating the capsule of the first infusing member 21.

Still according to this embodiment, the rib 12 extends from the bottom of the recess accommodating the capsule of the first infusing member 21 along a substantially vertical straight line.

Alternatively, the ribs 12 can extend from the bottom of the recess accommodating the capsule of the first infusing member 21 along an inclined straight line, or alternately along a curved line or a given path, without departing from the protection scope of the present invention.

Still according to the embodiment shown in Figures, the three ribs 12 are angularly spaced on the inner side surface 8 of the recess accommodating the capsule of the first infusing member 21 correspondingly to the space among the grooves 11 on the outer side surface of the capsule 10.

Preferably, the three ribs 12 are angularly spaced one from another by the same angle, in other terms the angular distance between two couples of circumferentially adjacent ribs is the same and equal to about 120°.

According to another embodiment, there can be more than three ribs 12 without departing from the protection scope of the present invention.

Each rib 12 has width l2 between 1.5 and 5 mm, preferably each rib 12 has width l2 between 2 and 3 mm, limits included. Each rib 12 has width l2 slightly greater than that of the groove 11 in which it will enter.

Figure 3:
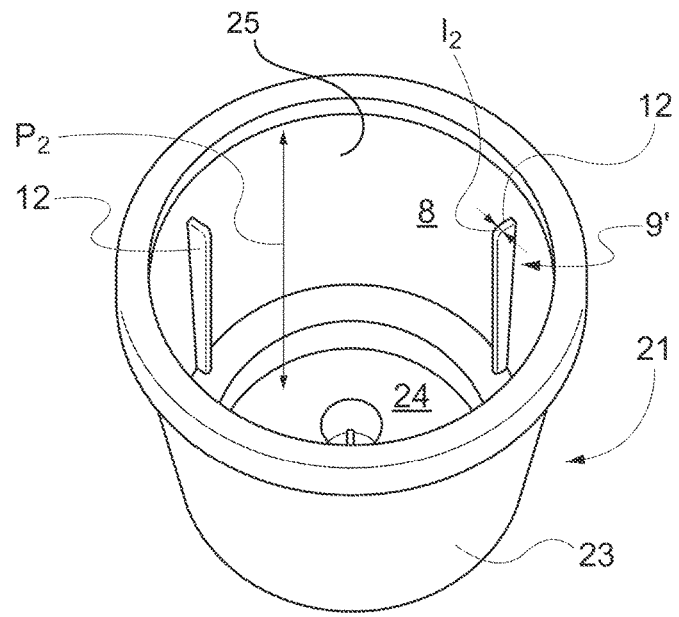
FIG. 3 is a schematic perspective view of a first embodiment of a first infusing member of an infusion assembly of the system for making an infused beverage according to the present invention.

Still according to another embodiment also shown in FIG. 3, the first infusing member 21 has a member 25 that is removable with respect to the recess 26.

Preferably, each rib 12 has not constant extent, on the contrary extent increasing along a direction leaving the bottom.

The pattern of the extent of each rib 12 from the bottom of the recess accommodating the first infusing member 21 is corresponding to the pattern of the depth of the respective groove 11 leaving the bottom 7 of the body of the capsule 10.

In FIG. 4 the capsule 10 coupled with the first infusing member is shown, it has to be noted that each rib 12 is penetrated into the respective groove 12 thus supporting the structural stiffness of the capsule 10 during the infusion.

Still according to another embodiment not shown in figures, the first infusing member 21 has a member removable with respect to the recess 26.

The removable member 25 comprises at least one annular portion provided with second coupling means 9' adapted to removably engage with the first coupling means 9.

In this case, for example the ribs 12 will be obtained on the annular portion and will engage the grooves 11 provided on the capsule.

According to this embodiment, the side wall of the first infusing member 21, or the side wall of the recess 26, can have a smooth surface facing the radially outer surface of the annular portion.

The advantages of the system according to the present invention are evident concerning the structural stiffness lent to the capsule—infusion assembly whole; during the infusion, the ribs 12 entering the apposite grooves in fact support the wall of the capsule thus avoiding the latter from bending on itself.

The action of the disc-shaped member 17 with the coupling among the ribs 12 and the grooves allows distributing the applied pressures due to the inflow of the pressurized fluid on the capsule portions having greater structural resistance, in addition to avoid the disc-shaped member 17 from reaching the bottom 7 of the capsule 10.

Moreover, the presence of the corresponding coupling means on the capsule 10 and on the infusion assembly 20 allows the capsule to be customized.

In other terms, in the infusion assembly according to the present invention it is extremely difficult if not impossible to use capsules different from those originally provided, for example counterfeited ones.

To the embodiments herein represented in detail various modifications can be made, anyway remaining in the protection scope of the invention, defined by the following claims.

The invention claimed is:

1. System (100) for making an infused beverage, comprising
    at least one infusion assembly (20) of a machine for preparing infused beverages;
    at least one capsule (10) containing an aromatic substance for the preparation of an infused beverage through interaction with a liquid; said capsule (10) comprising:
    a cup-shaped body (3) comprising a recess having a depth (P) adapted to contain a predetermined amount of an aromatic substance; said body (3) comprising at least one side wall (6) and a bottom (7) and having a vertical axis (X-X);
    said at least one first infusion assembly (20) comprising:
    a first infusing member (21), comprising a recess (26) adapted for accommodating at least partially said capsule (10),
    a second infusing member (22), adapted for cooperating with said first infusing member (3) so as to at least partially close said recess (26) to define an accommodating seat (6) with said first infusing member;
    wherein:
    said at least one capsule (10) comprises first coupling means (9);
    said at least one infusion assembly (20) comprises second coupling means (9') adapted to removably engage said first coupling means (9);
    said first coupling means (9) comprise at least one radially protruding member or radial recess;
    said second coupling means (9') comprising at least one radial recess or radially protruding member shaped to couple respectively with the corresponding radial recess or radially protruding member of the first coupling means (9); and
    said capsule (10) comprising a disc-shaped member (17) comprising a plurality of holes (27) for the water passage and adapted to be at least partially inserted in the recess (4), said disc-shaped member (17) being shaped and positioned to abut against at least one shoulder (16) formed by said at least one radially protruding member or radial recess.

2. System (100) for making an infused beverage according to claim 1, wherein said first coupling means (9) comprise at least one radial groove (11) arranged on the radially outer surface of said side wall (6).

3. System (100) for making an infused beverage according to claim 2, wherein said groove (11) extends for at least 50% of the depth (P) of said recess.

4. System (100) for making an infused beverage according to claim 2, wherein said groove (11) extends from said bottom (7) along a straight line.

5. System (100) for making an infused beverage according to claim 1, wherein said first coupling means (9)

comprise at least three grooves (11) angularly spaced on the radially outer surface of said side wall (6).

6. System (100) for making an infused beverage according to claim 1, wherein said second coupling means (9') comprise at least one rib (12) extending axially on the inner surface of said recess (26).

7. System (100) for making an infused beverage according to claim 6, wherein said rib (12) extends for at least 50% of the depth (P) of said recess (26).

8. System (100) for making an infused beverage according to claim 6, wherein said rib (12) extends from the bottom (24) of said recess (26).

9. System (100) for making an infused beverage according to claim 6, wherein said second coupling means (9') comprise at least three ribs (12) angularly spaced on the inner surface (8) of said first infusing member (21) and adapted to couple with three corresponding grooves (11) provided on said capsule (10).

10. System (100) for making an infused beverage according to claim 6, wherein each rib has an extent of at least 2 mm in the radial direction.

11. System (100) for making an infused beverage according to claim 2, wherein said disc-shaped member (17) is shaped to abut against at least one shoulder (16) formed by said at least one groove (11).

12. System (100) for making an infused beverage according to claim 1, wherein the first infusing member (21) is removable with respect to the machine.

13. System (100) for making an infused beverage according to claim 1, wherein the first infusing member (21) has a member removable with respect to said recess (26); said removable member comprising at least one annular portion comprising said second coupling means (9') adapted to removably engage said first coupling means (9).

14. System (100) for making an infused beverage according to claim 7, wherein said second coupling means (9') comprise at least three ribs (12) angularly spaced on the inner surface (8) of said first infusing member (21) and adapted to couple with three corresponding grooves (11) provided on said capsule (10).

15. System (100) for making an infused beverage according to claim 7, wherein each rib has an extent of at least 2 mm in the radial direction.

16. System (100) for making an infused beverage according to claim 8, wherein said second coupling means (9') comprise at least three ribs (12) angularly spaced on the inner surface (8) of said first infusing member (21) and adapted to couple with three corresponding grooves (11) provided on said capsule (10).

17. System (100) for making an infused beverage according to claim 8, wherein each rib has an extent of at least 2 mm in the radial direction.

18. System (100) for making an infused beverage according to claim 9, wherein each rib has an extent of at least 2 mm in the radial direction.

* * * * *